United States Patent
Foltin

(10) Patent No.: US 9,428,103 B2
(45) Date of Patent: *Aug. 30, 2016

(54) METHOD FOR CONTROLLING A LIGHT EMISSION OF A HEADLIGHT OF A VEHICLE

(75) Inventor: Johannes Foltin, Ditzingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 489 days.

This patent is subject to a terminal disclaimer.

(21) Appl. No.: 13/591,470

(22) Filed: Aug. 22, 2012

(65) Prior Publication Data

US 2013/0051618 A1  Feb. 28, 2013
US 2016/0114719 A9  Apr. 28, 2016

Related U.S. Application Data

(63) Continuation-in-part of application No. 13/389,166, filed as application No. PCT/EP2010/061419 on Aug. 5, 2010, now Pat. No. 9,102,265.

(30) Foreign Application Priority Data

Aug. 7, 2009  (DE) .................... 10 2009 028 342
Aug. 7, 2009  (DE) .................... 10 2009 028 344
Aug. 23, 2011 (DE) .................... 10 2011 081 380

(51) Int. Cl.
G06K 9/00  (2006.01)
G01J 1/32  (2006.01)
B60Q 1/08  (2006.01)

(52) U.S. Cl.
CPC ........... *B60Q 1/085* (2013.01); *B60Q 2300/45* (2013.01)

(58) Field of Classification Search
CPC ..... B60Q 1/085; B60Q 1/115; B60Q 1/1423; B60Q 1/143; B60Q 2300/45
See application file for complete search history.

(56) References Cited

U.S. PATENT DOCUMENTS 6,742,904 B2  6/2004  Bechtel et al.
6,831,261 B2 * 12/2004 Schofield ............... B60N 2/002
                                                                250/205

(Continued)

FOREIGN PATENT DOCUMENTS

CN   1602260 A    3/2005
CN   100420592 C  9/2008

(Continued)

OTHER PUBLICATIONS

Simon D. McLoughlin et al., "Classification of road sign type using mobile stereo vision," Proceedings of SPIE. Jun. 1, 2005, pp. 133-142.

*Primary Examiner* — Stephen R Koziol
*Assistant Examiner* — Timothy Choi
(74) *Attorney, Agent, or Firm* — Norton Rose Fulbright US LLP

(57) ABSTRACT

A method for controlling a light emission of at least one headlight of a vehicle, which has a traffic sign recognition device. The method includes receiving at least one traffic sign recognition signal from an interface to the traffic sign recognition device. In this instance, the at least one traffic sign recognition signal represents a traffic sign recognized in a course of the road currently being traveled by the vehicle. The method also includes setting a debounce time and/or a debounce stretch for a change in the light emission of the at least one headlight between first and second radiation characteristics as a function of the at least one traffic sign recognition signal. Finally, the method includes delaying the change in the light emission of the at least one headlight by the debounce time set and/or the debounce stretch set, to control light emission of the at least one headlight.

10 Claims, 4 Drawing Sheets

(56) References Cited

U.S. PATENT DOCUMENTS

| | | |
|---|---|---|
| 7,566,851 B2 | 7/2009 | Stein et al. |
| 7,942,529 B2 | 5/2011 | Tanassi et al. |
| 8,328,368 B2 | 12/2012 | Luciano |
| 8,350,690 B2 | 1/2013 | Biondo et al. |
| 8,462,988 B2 | 6/2013 | Boon |
| 8,552,852 B1 | 10/2013 | Hertz et al. |
| 8,596,793 B2 | 12/2013 | Tanassi et al. |
| 8,712,637 B2 | 4/2014 | Ehlgen et al. |
| 8,854,201 B1 | 10/2014 | Hertz et al. |
| 2007/0221822 A1* | 9/2007 | Stein .................. B60Q 1/143 250/205 |
| 2008/0175012 A1 | 7/2008 | Shimaoka et al. |
| 2008/0205704 A1* | 8/2008 | Furusawa ................. 382/104 |
| 2009/0072124 A1 | 3/2009 | Schofield et al. |
| 2010/0265330 A1 | 10/2010 | Li et al. |
| 2012/0203427 A1* | 8/2012 | Ehlgen et al. ............. 701/36 |
| 2013/0051618 A1 | 2/2013 | Foltin |
| 2013/0058116 A1 | 3/2013 | Galbas et al. |

FOREIGN PATENT DOCUMENTS

| | | | |
|---|---|---|---|
| DE | 100 60 734 | 6/2002 | |
| DE | 10 254806 | 6/2004 | |
| DE | 10 2005 051 049 | 5/2006 | |
| DE | 10 2005 027 887 | 12/2006 | |
| DE | 10 2006 050 546 | 4/2008 | |
| DE | 10 2006 055 904 | 5/2008 | |
| DE | 10 2007 051 272 | 4/2009 | |
| DE | 10 2008 053 945 | 5/2010 | |
| DE | 10 2008 058 386 | 5/2010 | |
| DE | 102009 054 101 | 6/2010 | |
| DE | 102009051485 A1 | 6/2010 | |
| DE | 10 2009 024 129 | 12/2010 | |
| DE | 10 2009 028 344 | 2/2011 | |
| DE | 10 2009 057 032 | 6/2011 | |
| EP | 2 030 838 | 3/2009 | |
| EP | 2 052 911 | 4/2009 | |
| EP | 211 95 92 | 11/2009 | |
| JP | 2008-120162 A | 5/2008 | |
| JP | 2011-084106 A | 4/2011 | |
| WO | WO2011/015625 * | 2/2011 | ............... B60Q 1/08 |

* cited by examiner

METHOD FOR CONTROLLING A LIGHT EMISSION OF A HEADLIGHT OF A VEHICLE

RELATED APPLICATION INFORMATION

The present application claims priority to and the benefit of German patent application no. 10 2011 081 380.2, which was filed in Germany on Aug. 23, 2011, the disclosure of which is incorporated herein by reference. The present application also is a continuation-in-part of U.S. patent application Ser. No. 13/389,166, which is the U.S. national stage of International Pat. App. No. PCT/EP10/61419, filed Aug. 5, 2010, which claims priority to German patent application nos. 10 2009 028 342.0 and 10 2009 028 344.7, both of which were filed in Germany on Aug. 7, 2009.

FIELD OF THE INVENTION

The present invention relates to a method for controlling a light emission, of a headlight of a vehicle, onto a device which is developed to carry out steps of such a method, as well as to a computer-program product having program code, which is stored on a machine-readable carrier, for carrying out such a method when the program is run on a device.

BACKGROUND INFORMATION

In the case of a light control in a vehicle using a known high beam assistant, debounce times or debounce stretches distances are used to delay the putting on of the brights. In this connection, in the case of a high beam assistant, a certain debounce time or debounce stretch is generally provided, so that a vehicle, which may disappear hidden by a curve, for instance, is not dazzled upon its reappearance. The debouncing is generally required for all high beam assistants.

German document DE 10 2008 053 945 A1 discusses a headlight system for a vehicle, in which the luminous axis of the headlights is able to be pivoted sideways, in order to change a common emission characteristic of the headlights.

SUMMARY OF THE INVENTION

With this as background, the exemplary embodiments and/or exemplary methods of the present invention provide a method for controlling a light emission, of a headlight of a vehicle, a device which is developed to carry out steps of such a method, as well as a computer-program product having program code, which is stored on a machine-readable carrier, for carrying out such a method when the program is run on a device, according to the independent and the alternative independent claims. Advantageous refinements are yielded from the respective dependent claims and the following description.

The exemplary embodiments and/or exemplary methods of the present invention provide a method for controlling a light emission of at least one headlight of a vehicle, the vehicle having a traffic sign recognition device; the method having the following steps:

receiving at least one traffic sign recognition signal from an interface to the traffic sign recognition device, the at least one traffic sign recognition signal representing a traffic sign recognized in a course of the road currently being traveled by the vehicle.

setting a debounce time and/or a debounce stretch for a change in the light emission of the at least one headlight between a first radiation characteristic and a second radiation characteristic as a function of the at least one traffic sign recognition signal; and delaying of the change of the light emission of the at least one headlight by the debounce time set and/or the debounce stretch, in order to control the light emission of the at least one headlight.

The vehicle may be a motor vehicle, particularly a road-bound motor vehicle, such as a passenger car, a truck, a vehicle for the transport of persons or another type of commercial vehicle. The at least one headlight may be a front headlight, for example. The light emission of the headlight, in this case, may be changeable in steps or in a stepless manner. The light emission of the headlight may be changed, in this instance, with respect to the radiation characteristic of the headlight. The radiation characteristic may have a brightness, an illumination angle and/or the like. For example, the first radiation characteristic may correspond to a lower illumination intensity or illumination distance of the headlight than the second radiation characteristic. The light emission of the headlight may, in this case, be changed from the first radiation characteristic to the second radiation characteristic or from the second radiation characteristic to the first radiation characteristic. The first radiation characteristic may correspond, in this instance, to a low beam, or the like, or be similar to it, and the second radiation characteristic may correspond to a high beam or the like, or be similar to it. The traffic sign recognition device may have a camera directed in the forward travel direction of the vehicle, or an image processing device and/or the like.

The traffic sign recognition device generates the traffic sign recognition signal. The traffic sign recognition signal indicates which traffic sign has been recognized by the traffic sign recognition device in the course of the road currently being traveled by the vehicle. The traffic sign recognition signal may, for instance, represent a type of traffic sign and the exact traffic sign involved. The traffic sign recognition signal may also represent the traffic sign uniquely. The traffic sign may be a traffic sign board, a light sign system and/or a roadway marking, but also a street illumination or a light post. The traffic sign boards may include signs of prohibition, signs of order to do something, warning signs, direction signs, signs of locality and the like. In this context, an outline, symbols and or script of the traffic sign may be recognized and represented in the traffic sign recognition signal. The debounce time represents a form of hysteresis. The debounce time, in this instance, may be understood to be a delay time in the case of changing the light emission of the headlight between the first radiation characteristic and the second radiation characteristic, for example. The debounce time may be shortened or prolonged in the step of the setting with respect to a previously set value or a specified value. By debounce stretch one may understand a speed-dependent debounce time.

At a standstill of the vehicle, the debounce time may become any length of time, for example. Thus, by debounce stretch one should understand especially a waiting stretch of road that should be traveled until a switchover of the headlight to another radiation characteristic takes place, and consequently the debounce stretch is also comparable to a debounce time, but taking into account the current motion of the vehicle.

The exemplary embodiments and/or exemplary methods of the present invention also provide a control unit that is developed to carry out or implement the steps of the method according to the present invention. The device may particularly have devices that are developed for each to carry out one step of the method. The object on which the exemplary embodiments and/or exemplary methods of the present invention is based may be attained quickly and efficiently by this embodiment variant of the invention in the form of a device, as well.

In the case at hand, by a device one may understand an electrical device or a control unit which processes sensor signals and outputs control signals as a function thereof. The device may have an interface, which may be developed as hardware and/or software. In a hardware configuration, the interfaces may, for example, be part of a so-called system ASIC that contains the most different functions of the device. However, it is also possible for the interfaces to be separate, integrated switching circuits or to be at least partially made up of discrete components. In a software configuration, the interfaces may be software modules which are present on a microcontroller in addition to other software modules, for example.

An advantageous development also includes a computer program product having program code that is stored on a machine-readable medium such as a semiconductor memory, a hard-disk memory or an optical memory, which is used to implement the method according to one of the specific embodiments described above, when the program is executed on a device.

The exemplary embodiments and/or exemplary methods of the present invention are based on the understanding that, in controlling a light emission of at least one headlight of a vehicle, the change in the light emission of the at least one headlight is able to be improved between a first radiation characteristic and a second radiation characteristic in that a debounce time and/or debounce stretch to be used for the change is set with the aid of traffic signs. Consequently, a traffic sign recognition is used for setting the debounce time and/or the debounce stretch of the at least one headlight is used. The light emission of the at least one headlight may then be advantageously controlled based on the adjusted debounce time and/or debounce stretch.

One advantage of the exemplary embodiments and/or exemplary methods of the present invention is that, from a recognized traffic sign, the road situation or the course of the road may be reliably and accurately derived, since road construction specifications lead to uniform sign posting. The debounce time and/or the debounce stretch is used in this case to a waiting time or waiting stretch, for example, before going back to high beam, and thus as a preventive avoidance of dazzling with respect to other vehicles. In addition, too frequent a change in the light emission, for instance, too frequent a raising and lowering of the beam is able to be avoided. Consequently, for the driver too, a disturbing effect of a frequent change in the light emission becomes less, and therefore driving safety goes up. In the debounce time and/or the debounce stretch an advantageous compromise may be reached in this case between range of vision and prophylactic avoidance of dazzling while taking into account the traffic sign recognition.

A step of evaluating the at least one traffic sign recognition signal may also be provided, in order to determine at least one property of the course of the road currently being traveled by the vehicle. The at least one property may, for instance, have an inclination or rise in the course of the road, the appearance of at least one curve and the like. In the step of evaluation, the at least one traffic sign recognition signal may be analyzed, interpreted or the like. Signal curves and properties may be stored in a look-up table, for example. A signal curve of the at least one traffic sign recognition signal may then be aligned with the reference signal curves to identify the correct property. This specific embodiment offers the advantage that properties of the course of the road, which have a great effect on the control of the light emission, and therefore great meaningfulness as well as relevance, may be utilized.

In this connection, the at least one property of the course of the road being currently traveled by the vehicle may have a road course-conditioned range of vision and/or a designed speed of the road curve being currently traveled by the vehicle. The design of roads takes place according to the guidelines for putting in roads according to the so-called design speed. The design speed influences a whole series of parameters of the design planning of roads. Among these should be counted, for example, minimum curve radius, clothoid parameters, maximum length of straight lines, maximum length inclination, dome and tub minimum radius and transverse inclination. All these parameters are meaningful for the visibility and range of vision in the current road curve. If, according to that, the design speed of the current course of the road is known, one may draw a conclusion on the visibility or range of vision before the vehicle. This specific embodiment offers the advantage that the control of the light emission takes place on a basis that is meaningful, reliable and looking ahead.

In addition, a step of assigning a setting value to the at least one traffic sign recognition signal may be provided, based on the at least one property of the course of the road currently being traveled by the vehicle. In this context, in the step of setting, the debounce time and/or the debounce stretch are able to be set as a function of the at least one traffic sign recognition signal and with the aid of the at least one setting value assigned to the at least one traffic sign recognition signal. As a function of the property of the course of the road determined in the step of evaluating, the setting value may effect a shortening, a prolonging or the maintaining of the debounce time in the step of the setting. The range of vision may be different depending on the landscape. In a plane without tree growth having a straight road, for example, vehicles are detected already from far away.

In such a case, in principle, a short debounce time and/or debounce stretch may be selected or set. On a curving hilly stretch having tree growth or other possibilities for covering, for example, a longer debounce time and/or debounce stretch may be selected or set, since other vehicles could come up suddenly in the vicinity of the vehicle. This specific embodiment has the advantage that, using the setting value, the relevant and meaningful properties of the course of the road are able to be taken into account along with the setting of the debounce time and/or the debounce stretch, in a simple manner.

In the step of receiving, at least one additional traffic sign recognition signal may be received from an interface to the traffic sign recognition device, the at least one further traffic sign recognition signal representing a traffic sign recognized in a course of road currently being traveled by the vehicle. In this context, in the step of setting, the debounce time and/or the debounce stretch are able to be set as a function of the at least one traffic sign recognition signal and with the aid of the at least one setting value assigned to the at least one traffic sign recognition signal. When the vehicle is traveling on a course of the road, one after another, several traffic signs may be recognized, and thus a plurality of traffic sign recognition signals may be received This specific embodiment offers the advantage that a plurality of traffic signs may also have an effect on the debounce time and/or debounce stretch in the step of the setting via the traffic sign recognition signal and the at least one additional traffic sign recognition signal. Consequently, the control of the light emission is able to take into consideration more exactly the current situation in the course of the road.

In this context, a step of combining the traffic sign recognition signal and the at least one additional traffic sign recognition signal may be provided in order to generate a combined traffic sign recognition signal. In this context, in the step of setting, the debounce time and/or the debounce stretch may be set as a function of the combined traffic sign recognition signal. In the step of combining, a logical linkage of the signals may take place. The step of combining may also take place in connection with the step of the evaluating. In this context, the step of combining may be carried out as a function of the evaluated properties of the traffic sign recognition signals. Based on the evaluated properties of the traffic sign recognition signals, a suitable type of combination may take place of the traffic sign recognition signals. This specific embodiment offers the advantage that, via the combined traffic sign recognition signal, particularly also traffic signs appearing shortly after one another, may also be taken into account corresponding to the properties of the course of the road concluded from this, perhaps to a different extent in the setting step.

According to one specific embodiment, in the step of setting, the debounce time and/or the debounce stretch is able to be set as a function of the traffic sign recognition signal and as a function of travel data of the vehicle and/or environmental information. The travel data in this case may have a speed of the vehicle, a yaw rate and/or the like.

The environmental information may be a number of oncoming vehicles, data of a navigation system, lane detection and/or the like. The debounce time and/or the debounce stretch may be set permanently, as a function of a characteristic motion of the vehicle, such as a speed-dependent one, a function of the yaw rate, etc., or it may be set with the aid of situations in the environment of the vehicle. For example, if a single vehicle is oncoming, the debounce time and/or the debounce stretch may be shortened, and thus, for instance, one may reset to high beam faster. The range of vision or the visibility in the current course of the road may also be determined via an evaluation of, perhaps, especially enriched map material of a navigation system, for example, provided it is available, since in that case the course of the road is visible far ahead and able to be estimated. Consequently, a virtual sensor may be created. This specific embodiment offers the advantage that the debounce time is able to be set even more accurately and adjusted to the current traffic and road situation. Consequently, a relationship between visibility and the avoidance of dazzling may be improved.

According to a further specific embodiment, a step of checking the debounce time set for plausibility with the aid of travel data of the vehicle and/or environmental information may be provided and a step of correcting the debounce time and/or the debounce stretch that is set, based on the travel data of the vehicle and/or the environmental information, if in the step of checking a lacking plausibility of the set debounce time and/or the debounce stretch shows up. The travel data of the vehicle and/or the environmental information may be used for the plausibility check of the debounce time and/or the debounce stretch set based on the traffic sign recognition signal. If, for example, the lane detection leads one to conclude that the course of the road is straight, the debounce time and/or the debounce stretch may be set a little higher. Likewise in the case when there are solid line lane markings in the middle, which leads one to conclude that passing is prohibited. A length of lines of the lane marking may also be used as an indicator for a design speed, since the length of the lines increases with the speed of the vehicle. This specific embodiment has the advantage that the debounce time and/or the debounce stretch is able to be set even more accurately, more certainly and more appropriately to the situation.

The exemplary embodiments and/or exemplary methods of the present invention are explained in greater detail by way of example, with reference to the attached drawings.

DETAILED DESCRIPTION

Figure 1:
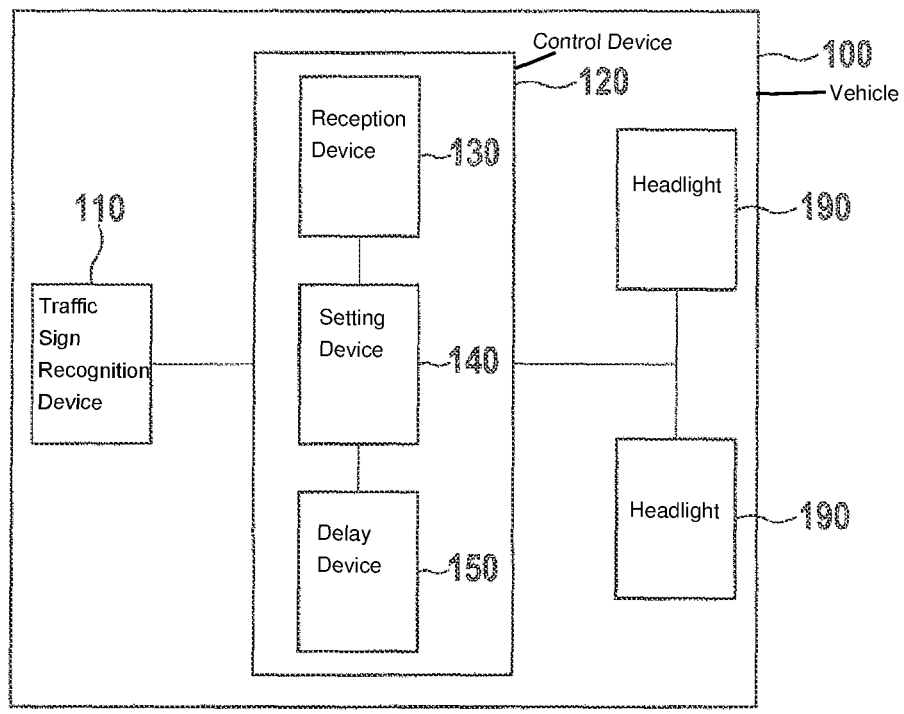
FIG. 1 shows a schematic illustration of a vehicle having a control device according to an exemplary embodiment of the present invention.

In the figures, same or similar elements may be shown by same or similar reference numerals, a repeated description of these elements being omitted. Furthermore, the figures in the drawings, their description and the claims contain numerous features in combination. In this context, it is clear to one skilled in the art that these features may also be considered individually or may be combined to form further combinations not explicitly described here. Furthermore, the exemplary embodiments and/or exemplary methods of the present invention are explained in the following description using different measures and dimensions, while the present invention should be understood as not being restricted to these measures and dimensions.

Furthermore, method steps according to the present invention may also be carried out repeatedly, as well as in a different sequence than the one described. If an exemplary embodiment includes an "and/or" linkage between a first feature/step and a second feature/step, this may be read to mean that the exemplary embodiment, according to one specific embodiment has both the first feature/the first step and also the second feature/the second step, and according to an additional specific embodiment, either has only the first feature/step or only the second feature/step.

FIG. 1 shows a schematic illustration of a vehicle 100 having a control device according to an exemplary embodiment of the present invention. Vehicle 100 has a traffic sign recognition device 110, a control device 120, a reception device 130, a setting device 140, a delay device 150 and two headlights 190. Traffic sign recognition device 110 is connected to control device 120, for instance, via at least one signal line. The two headlights 190 are connected to control device 120, for instance, via at least one signal line. Control device 120 is connected between traffic sign recognition device 110 and the two headlights 190. Control device 120 has reception device 130, setting device 140 and delay device 150.

Traffic sign recognition device 110 may have a camera and/or an image processing electronic system, for example. The traffic sign recognition device is developed to generate at least one traffic sign recognition signal, which represents a traffic sign recognized in a course of the road currently being traveled by the vehicle, and to emit it to control device 120.

Control device 120 is developed to carry out a control of a light emission of headlights 190 of vehicle 100. In particular, control device 120 is developed to carry out a control of the light emission of headlights 190 of vehicle 100 with respect to a debounce time and/or the debounce stretch. Reception device 130, setting device 140 and delay device 150 of control device 120 are connected to one another. To put it more exactly, reception device 130 is connected to setting device 140 and delay device 150 is connected to setting device 140. Consequently, setting device 140 is connected between reception device 130 and delay device 150.

Reception device 130 of control device 120 is developed to receive the at least one traffic sign recognition signal from traffic sign recognition device 110. Reception device 130 is able to output the at least one received traffic sign recognition signal to setting device 140.

Setting device 140 is able to receive the at least one traffic sign recognition signal from reception device 130. Setting device 140 is developed for setting a debounce time and/or a debounce stretch for a change in the light emission of headlights 190 between a first radiation characteristic and a second radiation characteristic as a function of the at least one traffic sign recognition signal. The change in the light emission of headlights 190 may be a process of putting on the brights, or the like. Setting device 140 is able to output the set debounce time and/or the debounce stretch in the form of a signal to delay device 150.

Delay device 150 is able to receive the set debounce time from setting device 140. Delay device 150 is developed to delay the change in the light emission of headlights 190 by the set debounce time and/or to prolong the debounce stretch. For this, delay device 150 is able to generate a delay value.

Control device 120 is able to output a control signal to headlights 190. The control signal is able to include and take into account the delay value of delay device 150. Control device 120 is developed to control the light emission of headlights 190 via the control signal.

Headlights 190 are able to receive the control signal from control device 120. The control signal is able to have the effect that the change in the light emission of headlights 190 takes place between the first radiation characteristic and the second radiation characteristic, while taking into account the debounce time set, and thus the delay value and/or the debounce stretch set.

Figure 2:
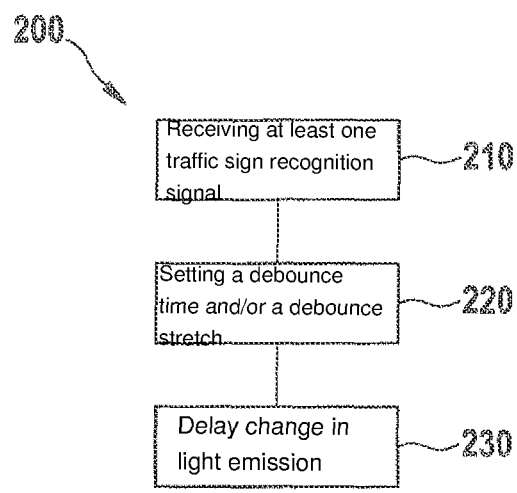
FIG. 2 shows a flow chart of a method according to one exemplary embodiment of the present invention.

FIG. 2 shows a flow chart of a method 200 for controlling a light emission of at least one headlight of a vehicle, in accordance with one exemplary embodiment of the present invention. In this context, the vehicle has a traffic sign recognition device. Method 200 has a step of receiving 210 at least one traffic sign recognition signal from an interface to the traffic sign recognition device. In this instance, the at least one traffic sign recognition signal represents a traffic sign recognized in a course of the road currently being traveled by the vehicle. Method 200 also has a step of setting 220 a debounce time and/or a debounce stretch for a change in the light emission of the at least one headlight between a first radiation characteristic and a second radiation characteristic as a function of the at least one traffic sign recognition signal. Finally, method 200 has a step of delaying 230 the change in the light emission of the at least one headlight by the debounce time set and/or the debounce stretch set, in order to control the light emission of the at least one headlight. Method 200 may advantageously be carried out in connection with a device, such as the control device in FIG. 1. Consequently, the control device in FIG. 1 may be developed to carry out the steps of method 200.

FIGS. 3 to 8 show illustrations of signpostings using various traffic signs, with the aid of the traffic signs, one being able to draw a conclusion on the design speed of the course of the road being currently traveled by a vehicle. The traffic signs are able to be recognized by a traffic sign recognition device, such as the traffic sign recognition device in FIG. 1, and used by a device such as the control device in FIG. 1 for controlling a light emission of at least one headlight of a vehicle. In this context, the device may carry out a method such as the method in FIG. 2. In this connection, based on the design speed of the course of the road, a refrain time is set for the at least one headlight.

Figure 3:
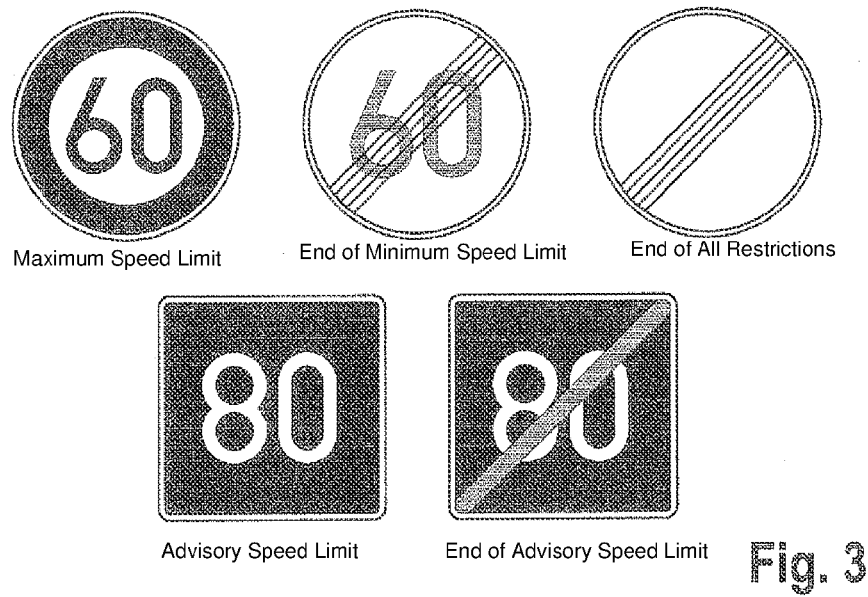
FIGS. 3 to 8 show illustrations of various traffic signs.

FIG. 3 shows speed regulating traffic signs as information on the design speed. FIG. 3 shows traffic signs for speed limits and/or lifting the speed limits and for recommended speeds and their lifting, which are able to be evaluated in order to determine the design speed of the course of the road. An additional "noise protection" on a speed limitation may give a hint that the design speed, and with that the range of vision in the current course of the road is higher than the given maximum speed.

Figure 4:
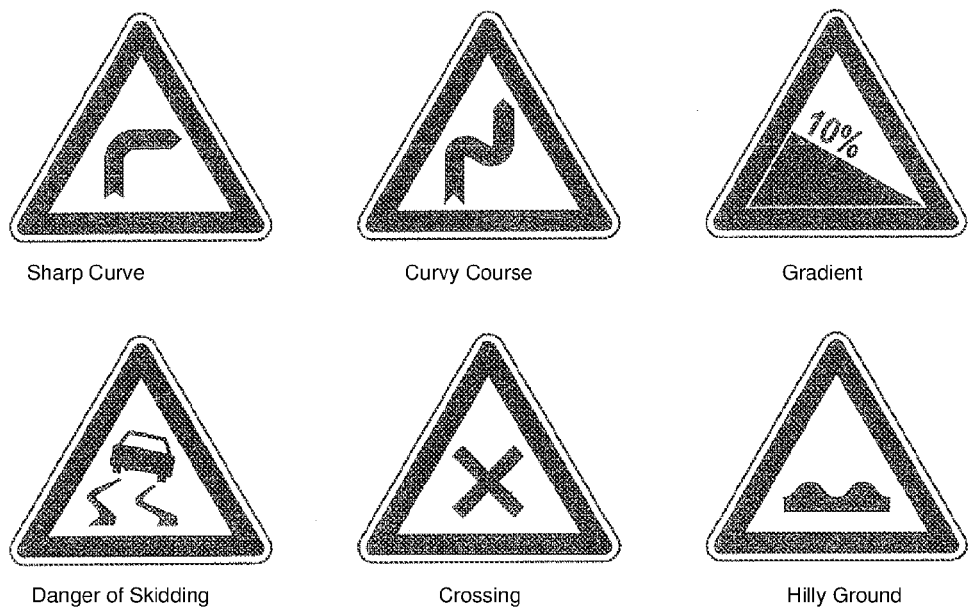

FIG. 4 shows warning signs in the case of which may the debounce time is shortened, since the design speed, just as probably the range of vision, in the current course of the road is low. In addition, the warning signs shown in FIG. 4 may be evaluated. The warning signs shown in FIG. 4 point out a sharp curve, a curvy course of the road, a gradient, danger of skidding, a crossing and hilly ground.

Figure 5:
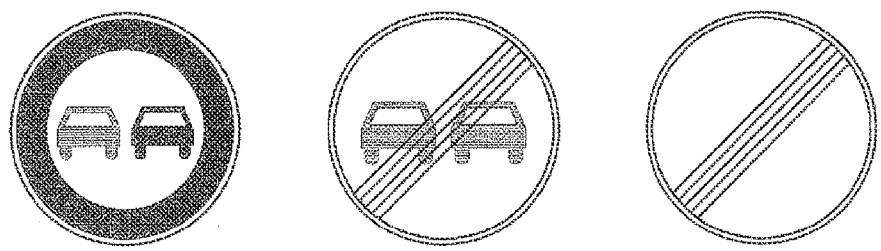

FIG. 5 shows traffic signs for no passing, the lifting of no passing as well as the general lifting of prohibitions and limitations. At poorly visible places of the course of the road, one may usually find a no passing sign, since the visibility distance is not great enough for a passing process. The lifting of the passing prohibition points to a range of vision that is becoming greater. This too may be utilized for a corresponding setting of the debounce time and/or the debounce stretch.

Figure 6:
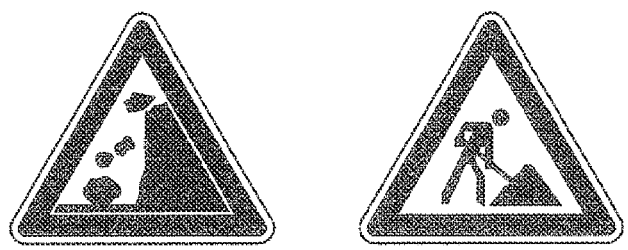

FIG. 6 shows a falling rocks warning sign and a construction site warning sign. Rocks fall off only from high places or rock walls. High regions are able to diminish the visibility in a curve. At construction sites one may frequently find detours which are curvy. Therefore, the falling rock sign and also the construction sign may be utilized to draw a conclusion as to the design speed or the visibility of the course of the road.

Figure 7:

FIG. 7 shows a general warning sign. Some traffic signs may be used differently in response to the evaluation with respect to the design speed or the visibility of the course of the road. A general warning sign, for example, may be used both for increasing the debounce time, for the sake of a prophylactic avoidance of dazzle, when a poorly visible location is suspected, and also for shortening the debounce time for increasing the range of vision, in order to detect the danger location in time.

Figure 8:
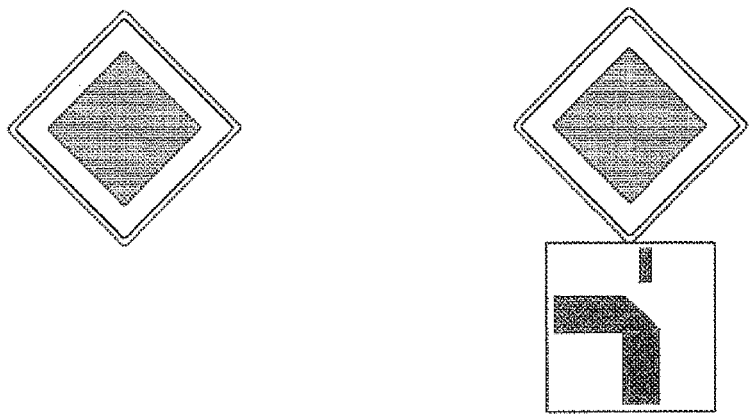
Figure 8:
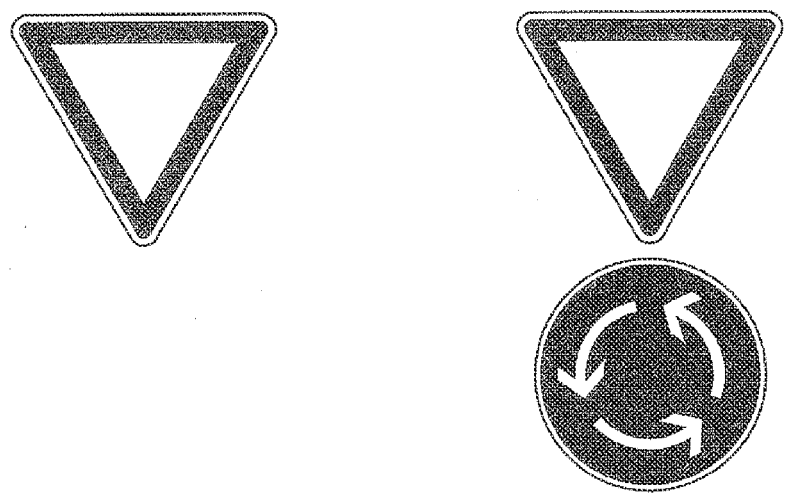
Figure 8:

FIG. 8 shows traffic signs which point out a crossing, circular traffic or a junction. This too is able to supply hints concerning the design speed or visibility of the course of the road.

Even further signs for estimating and determining the design speed may be utilized. Thus, for example, location signs, finger boards, directional boards for detecting sharp curves and the like.

The device and the method for controlling a light emission of at least one headlight of a vehicle according to exemplary embodiments of the present invention could thus be integrated into existing high beam assistants and used in connection with them. In this instance, debounce times and/or the debounce stretches for such an highbeam assistant are set with the aid of traffic signs and the design speed and/or range of vision derived from them. Consequently, the sign recognition is used for estimating the visibility and the setting of debounce times and/or the debounce stretches of headlight systems.

Either, for example, the high beam and/or the low beam, or the like, is set directly with the aid of the signs, or the parameterization is set differently, so that the high beam and/or the low beam, or the like, is also set as a function of additional influential variables.

What is claimed is:

1. A method for controlling a light emission of at least one headlight of a vehicle, which has a traffic sign recognition device, the method comprising:
   receiving at least one traffic sign recognition signal from an interface to the traffic sign recognition device, the at least one traffic sign recognition signal representing a traffic sign recognized in a course of road currently being traveled by the vehicle;
   setting at least one of a debounce time and a debounce stretch for a change in the light emission of the at least one headlight between a first radiation characteristic and a second radiation characteristic as a function of the at least one traffic sign recognition signal; and
   delaying the change of the light emission of the at least one headlight by the at least one of the debounce time set and the debounce stretch set, so as to control the light emission of the at least one headlight.

2. The method of claim 1, further comprising:
   evaluating the at least one traffic sign recognition signal, so as to determine at least one property of the course of the road currently being traveled by the vehicle.

3. The method of claim 2, wherein the at least one property of the course of the road being currently traveled by the vehicle has at least one of a road course-conditioned range of vision and/or a design speed of the course of the road being currently traveled by the vehicle.

4. The method of claim 2, further comprising:
   assigning a setting value to the at least one traffic sign recognition signal based on the at least one property of the course of the road currently being traveled by the vehicle, in the setting operation, the at least one of the debounce time and the debounce stretch being able to be set as a function of the at least one traffic sign recognition signal and with the aid of the setting value assigned to the at least one traffic sign recognition signal.

5. The method of claim 1, wherein in the receiving operation at least one additional traffic sign recognition signal from an interface to the traffic sign recognition device is received, the at least one additional traffic sign recognition signal representing at least one additional traffic sign recognized in a course of the road actually being traveled by the vehicle, and in the setting operation, the at least one of the debounce time and the debounce stretch is set as a function of the traffic sign recognition signal and the at least one additional traffic sign recognition signal.

6. The method of claim 5, further comprising:
   combining the traffic sign recognition signal and the at least one additional traffic sign recognition signal, so as to generate a combined traffic sign recognition signal, in the setting operation, the at least one of the debounce time and the debounce stretch being set as a function of the combined traffic sign recognition signal.

7. The method of claim 1, wherein, in the setting operation, the at least one of the debounce time and the debounce stretch is set as a function of the traffic sign recognition signal and as a function of at least one of travel data of the vehicle and environmental information.

8. The method of claim 1, further comprising:
   checking the at least one of the debounce time set and the debounce stretch set for plausibility with the aid of at least one of travel data of the vehicle and environmental information and a correcting of the at least one of the debounce time and the debounce stretch that is set, based on the at least one of travel data of the vehicle and the environmental information, if in the checking operation, there is a lack of plausibility of the at least one of the set debounce time and the debounce stretch.

9. A device for controlling a light emission of at least one headlight of a vehicle, which has a traffic sign recognition device, comprising:
   a control unit, wherein the control unit is configured to:
      receive at least one traffic sign recognition signal from an interface to the traffic sign recognition device, the at least one traffic sign recognition signal representing a traffic sign recognized in a course of road currently being traveled by the vehicle;
      set at least one of a debounce time and a debounce stretch for a change in the light emission of the at least one headlight between a first radiation characteristic and a second radiation characteristic as a function of the at least one traffic sign recognition signal; and
      delay the change of the light emission of the at least one headlight by the at least one of the debounce time set and the debounce stretch set, so as to control the light emission of the at least one headlight.

10. A non-transitory computer readable medium having a computer program, which is executable by a processor, comprising:
   a program code arrangement having program code for controlling a light emission of at least one headlight of a vehicle, which has a traffic sign recognition device, by performing the following:
      receiving at least one traffic sign recognition signal from an interface to the traffic sign recognition device, the at least one traffic sign recognition signal representing a traffic sign recognized in a course of road currently being traveled by the vehicle;
      setting at least one of a debounce time and a debounce stretch for a change in the light emission of the at least one headlight between a first radiation characteristic and a second radiation characteristic as a function of the at least one traffic sign recognition signal; and
      delaying the change of the light emission of the at least one headlight by the at least one of the debounce time set and the debounce stretch set, so as to control the light emission of the at least one headlight.

* * * * *